Aug. 25, 1931.  J. R. P. FRANCOTTE  1,820,534
BEACON FOR LUMINOUS SIGNALIZATION
Filed July 9, 1928
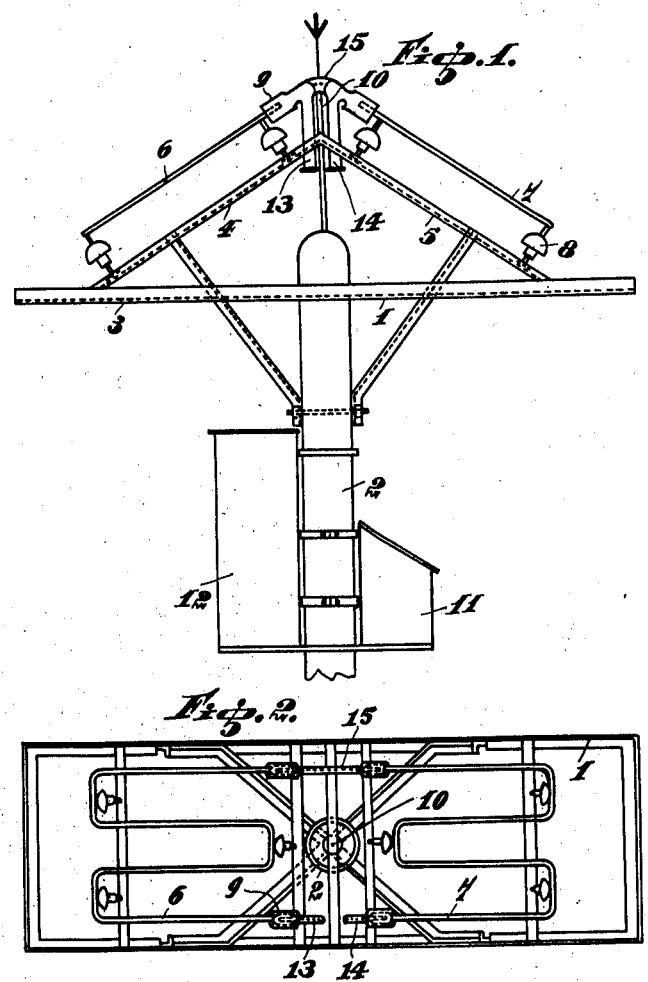

Patented Aug. 25, 1931

1,820,534

UNITED STATES PATENT OFFICE

JEAN REGNIER PIERRE FRANCOTTE, OF IXELLES-BRUSSELS, BELGIUM

BEACON FOR LUMINOUS SIGNALIZATION

Application filed July 9, 1928, Serial No. 291,157, and in Belgium July 15, 1927.

The present invention has for its object a luminous signalization beacon to be used for aircraft navigation lines and comprising, as light-emitting elements, a set of neon-filled tubes, the arrangement being such that the best luminous efficiency is obtained while the tubes are protected against any weather inclemencies and the high-voltage lead-wires are perfectly insulated.

The invention consists of grouping these neon-filled tubes (inside which electric discharges take place) in the shape of flat grids or grates lending themselves to easy piling-up and transport, due to their reduced volumes and to their being free of any part protruding from their central plane; it lies, on the other hand, in the adaptation of one or more so-designed grids upon the same beacon, with such a slope as to form two luminescent planes; the electrodes having the arrangement whereby they are perfectely protected by the porcelain caps of the insulators which free them from any rain water or from any other weather influences whatsoever.

Another object of this invention lies in the employment of the beacons thus devised for grouping various forms of luminous signs through a combination of several beacons arranged in a geometrical tracery or imitating the outline of any object, and so on.

The invention is to be described hereinafter with reference to the accompanying drawings, namely:

Fig. 1 an elevational view of the new beacon;

Fig. 2 a plan view of same;

Figs. 3 to 5, a few examples of compound arrangements of such luminous signals.

Whenever dealing with luminous signal sets as applied to aircraft lines, it is recognized that the luminous element capable of the greatest range of action and providing for the best visibility, is a neon-filled tube wherein the electric discharges are effected, especially in the case of foggy weather; and another advantage lies in the practically negligible consumption of such tubes. Owing to so valuable characteristics, these tubes have been utilized everywhere for the erection of light-houses and signalization beacons of far-reaching action. Putting them into practice, however, requires careful attention and circumspective measures, in view of securing a good insulation of the electrodes even under the worst circumstances, since they are frequently submitted to tensions as high as 5000 volts. On the other hand, owing to their considerable extension and to the bends they are ordinarily shaped into, glass tubes are particularly damaged by hail, on account of which they must be set sloping, in order to reduce the effect of hail stones upon them. It is, besides, desirable that the sets be equipped with neon-filled tubes alternately branched upon two transformers which mutually act as spare elements. Now, the present beacon, to be used, for example, for demarcating the outline of aircraft grounds, or to be placed at intervals all along land roads, has been so devised as to most simply and efficiently comply with the above stated requirements.

One will, besides, see further on how adoption of the device means possibility of most reducing the encumbrance of the high voltage equipment.

The beacon comprises a metal framing 1 mounted at the top part of a pole or mast 2. The lower part of framing 1 is provided with a sheet-iron bottom 3 serving as a protection, as any splinters of broken tubes or of broken insulators can drop on it. The framing consists of two surfaces 4 and 5 set sloping in mutually opposed directions, and parallel to which the neon-filled tubes 6 and 7 are mounted upon insulators 8, an arrangement complying with both requirements, i. e. the obliquity whereby the tubes are protected against breakage through fall of hailstones or thick layers of snow, and the maximum of luminous range which, together with the oblong shape, will enable observators to easily ascertain where they point to. The neon-filled tubes 6 and 7 are grid-shaped, as a result of bending them several times so as to have lengths of tube parallel to one another; a design whereby the terminals can be placed at the same end and at two angles to the grid, at the same time permitting to secure an excellent distribution of the luminous emission.

On the other hand, through fastening of the bent parts of the tube upon the insulators the invention does away with the necessity of an accurate execution and of keeping strictly to sizes, for, owing to the wide bends, a fairly great allowance is rendered possible. On the other hand, an advantage is secured through having the tubes equipped with twin-element electrodes like those claimed by the same inventor in his Belgian Patent No. 333,004 of 9th March 1926 and acting to reduce overheating of the metal of the electrodes. Arranging the twin-element electrodes and their blow-off pipes in the very plane of the grid means possibility of having the whole of the tube and accessory parts located in a same plane and, as a result, possibility of having a number of them piled up by simple superimposition inside boxes, subject to no risk of their ends getting broken on being handled.

This feature results in a special advantage of the present beacon, in that it will allow gangs of attendants in charge of supervision and upkeep, to easily carry about them a considerable number of spare tubes subject to no risk of breakage. The tube ends with electrodes are set into porcelain caps 9 the bottom of which opens into a duct running throughout the stem or pipe 10 of the insulator and throughout which is passed the wire feeding the single or double electrode with the necessary current. A suitable embodiment of the invention would comprise a choke coil 11 and its high voltage transformer 12 both of which being mounted at the top end of pole 2 a little below the framing 1, and two neon-filled tubes 6 and 7 series-mounted and opposed to one another their feeding to be effected by means of only one transformer 12. In such an arrangement, both feed wires from the secondary winding of the transformer are connected with both ends of the tubes 6 and 7 throughout the specially shaped cap insulators 13 and 14, while the opposed electrodes of the two neon-filled tubes end in a double cap insulator having the shape of a T whose stem contains the connection wire for series-coupling of the two tubes, as has been shown at 15 in Fig. 2. Should the user desire more safety, through having his beacon equipped with two transformers each of which would feed one of the neon-filled tubes, he would recur to four porcelain pipes with caps similar to those of pipes 13 and 14 for connecting the wires on to the electrodes.

A glance at the drawings will show, better than any explanation, how the present arrangement can act to prevent any deposit of snow upon the tubes and free them from rain water, likewise protecting them against breakage through impact of hailstones and rendering the high tension equipment more compact, at the same time securing a particularly efficient insulation for the high tension wires and especially for their ends united to the electrodes of the tubes.

Instead of mounting the neon-filled tube only upon two opposite inclined faces of the carrying frame, they may be disposed in a cross form on four similar inclined panels at right angles of each other.

Figs. 3 to 5 show how it is possible, through suitably grouping a number of beacons similar to that just described, to secure a great diversity of shapes in such signals, and to render these capable of emitting many different indications for the airmen who have to watch them.

Fig. 3, as an example, shows a cross-shaped set of four beacons; Fig. 4 shows four beacons arranged in a square and Fig. 5 illustrates a series of beacons the elongated arrangement of which can, for instance, show to any airman the important point of his route or any determined length of distance. It need not to be added that these embodiments are not restrictive, and that one could recur to any suitable grouping, either in the way of geometrical traceries, or of numerals etc. to convey any desirable meaning or any useful indication to the airman's mind.

In order to facilitate replacing broken or waste tubes, they may be mounted on rectangular metallic frames, slidably carried by and easily removable from the supporting frame.

I claim:

1. A skylight for aerial and nautical purposes, comprising a pole, a horizontal framework mounted thereon at its upper end, a pair of plane frames mounted on the framework at an acute angle thereto and joined to each other at their upper end, insulators on said frames, discharge tubes, containing a rear gas and forming a tubing doubled back and forth upon itself, mounted on said insulators and forming two plane surfaces parallel to said frames, and electrodes for each tube located at the meeting edge of said frames.

2. A skylight for aerial and nautical purposes, comprising a pole, a horizontal framework mounted thereon at its upper end, a pair of plane frames mounted on the framework at an acute angle thereto and joined to each other at their upper end, insulators on said frames, discharge tubes, containing a rear gas and forming a tubing doubled back and forth upon itself, mounted on said insulators and forming two plane surfaces parallel to said frames, and electrodes for each tube located at the meeting edge of said frames, the two tubes being connected in series.

3. A skylight for aerial and nautical purposes, comprising a pole, a horizontal framework mounted thereon at its upper end, a pair of plane frames mounted on the framework at an acute angle thereto and joined to each other at their upper end, insulators on said frames, discharge tubes, containing a rare gas and forming a tube doubled back and forth upon itself, mounted on said insulators and forming two plane surfaces parallel to said frames, electrodes for each tube located at the meeting edge of said frames, the two tubes being connected in series, two sockets of insulating material having their axis in the plane of the tubes and integral with a tubular stem for the lead at an acute angle to the socket, and a double socket having a socket in both planes of the tubes for the connection of the two series-connected tubes.

In testimony whereof, I signed hereunto my name.

JEAN REGNIER PIERRE FRANCOTTE.